United States Patent [19]

Miyamori et al.

[11] Patent Number: 4,511,784
[45] Date of Patent: Apr. 16, 1985

[54] METHOD FOR WELDING BY MAGNETICALLY DRIVEN ARC

[75] Inventors: Hideaki Miyamori, Hatano; Kenji Takagi, Yokohama; Shigeru Sato, Ebina; Fujio Takahashi, Yokohama; Mikio Ozawa, Kanagawa, all of Japan

[73] Assignee: Nippon Kokan Koji Kabushiki Kaisha, Yokohama, Japan

[21] Appl. No.: 485,184

[22] Filed: Apr. 15, 1983

[51] Int. Cl.³ ............................................. B23K 9/08
[52] U.S. Cl. ..................................... 219/123; 219/100
[58] Field of Search ......................... 219/123, 97, 100

[56] References Cited

U.S. PATENT DOCUMENTS

| 3,102,946 | 9/1963 | Fonberg | 219/123 |
| 3,940,641 | 2/1976 | Dooley | 310/306 |
| 4,273,986 | 6/1981 | Edson et al. | 219/123 |

FOREIGN PATENT DOCUMENTS

199568 12/1982 Japan .................................. 219/123

Primary Examiner—Roy N. Envall, Jr.
Assistant Examiner—C. M. Sigda
Attorney, Agent, or Firm—Frishauf, Holtz, Goodman & Woodward

[57] ABSTRACT

A method for welding by a magnetically driven arc, which comprises placing two objects of welding in butt formation with a small gap between the end edges thereof to form a welding line; parallelly connecting a first electric circuit comprising the two objects of welding and a cable arranged on the surface side of the two objects of welding and a second electric circuit comprising the two objects of welding and another cable arranged on the back side of the two objects of welding to a welding power source; flowing a welding current through the first and second electric circuits to produce an arc in the small gap; moving the arc along the welding line under the effect of an electromagnetic force in the direction of the welding line, the electromagnetic force being produced by the magnetic flux of magnetizing coils provided near the end edges of the two objects of welding and welding current flowing through the arc; and changing the amount of welding current flowing through the first and second electric circuits to control the electromagnetic force in the thickness direction of the two objects of welding; thereby continuously moving the arc in the thickness direction of the two objects of welding, thus uniformly heating the end edge of the two objects of welding to a welding temperature by the heat of the moving arc.

9 Claims, 15 Drawing Figures

METHOD FOR WELDING BY MAGNETICALLY DRIVEN ARC

FIELD OF THE INVENTION

The present invention relates to a method for welding two objects of welding of which the end edges are placed in butt formation with a small gap therebetween by a magnetically driven arc.

BACKGROUND OF THE INVENTION

The method for welding by a magnetically driven arc is known as a method for butt-welding two objects of welding such as metal plates or metal pipes. This method for welding by a magnetically driven arc comprises the steps of placing two objects of welding in butt formation with a small gap between the end edges thereof, moving an arc produced in said small gap along the welding line under the effect of an electromagnetic force, heating said end edges by the heat of said arc to a welding temperature, and then, pushing said heated end edges of said two objects of welding against each other to weld together said two objects of welding.

In the conventional method for welding by a magnetically driven arc mentioned above, however, the arc produced in the small gap between the two objects of welding does not move in the thickness direction of the end edges of the two objects of welding. When the two objects of welding have a large thickness, therefore, it is not possible by this method to uniformly heat the end edges in the thickness direction, thus leading to an unsatisfactory weld.

The following methods are known as methods for solving the above-mentioned problem:

(1) A method for controlling a magnetically driven arc, disclosed in Japanese Patent Provisional Publication No. 123,542/79 dated Sept. 25, 1979, which comprises:

placing two objects of welding in butt formation with a small gap between the end edges thereof, said small gap forming a welding line between said two objects of welding; connecting said two objects of welding to a welding power source by a cable to form an electric circuit comprising said welding power source, said cable and said two objects of welding; flowing a welding current through said electric circuit to produce an arc in said small gap between said two objects of welding; providing a magnetizing coil on each of the surface side and the back side of said two objects of welding in parallel with said welding line between said two objects of welding, near said end edge of each of said two objects of welding, said magnetizing coils producing a magnetic flux in said small gap in the thickness direction of said two objects of welding; moving said arc along said welding line under the effect of electromagnetic force in the direction of said welding line produced by said magnetic flux and said welding current flowing through said arc; and, at the same time, changing the ratio of exciting current between the magnetizing coil provided on the surface side of each of said two objects of welding and the magnetizing coil provided on the back side of each of said two objects of welding to position said arc at the center of the end edges of said two objects of welding in the thickness direction thereof (hereinafter referred to as the "prior art (1)").

(2) A method and an apparatus for rotary arc welding disclosed in Japanese Patent Publication No. 32,851/77 dated Aug. 24, 1977, which comprise:

placing two metal pipes in butt formation with a small gap between the end edges thereof, said small gap forming a welding line between said two metal pipes; connecting said two metal pipes to a welding power source by a cable to form an electric circuit comprising said welding power source, said cable and said two metal pipes; flowing a welding current through said electric circuit to produce an arc in said small gap between said two metal pipes; providing a magnetizing coil on the surface side of each of said two metal pipes in parallel with said welding line between said two metal pipes, near said end edge of each of said two metal pipes, said magnetizing coils producing a magnetic flux in said small gap in the thickness direction of said two metal pipes; moving said arc along said welding line under the effect of an electromagnetic force in the direction of said welding line produced by said magnetic flux and said welding current flowing through said arc; and providing an electrically conductive cylinder connected to another power source in said two metal pipes concentrically with said two metal pipes at a position near the small gap between said end edges of said two metal pipes, to continuously and controllably moving said arc in the thickness direction of the end edges of said two metal pipes under the effect of magnetic force produced by said electrically conductive cylinder (hereinafter referred to as the "prior art (2)").

In the above-mentioned prior art (1), however, it is necessary to provide another magnetizing coil on the back side of each of the two objects of welding for the purpose of positioning the arc produced in the small gap between the two objects of welding at the center of the end edges of the two objects of welding in the thickness direction thereof. In the above-mentioned prior art (2), it is necessary to provide an electrically conductive cylinder connected to another power source in the two metal pipes concentrically with the two pipes at a position near the small gap between the end edges of the two pipes for the purpose of continuously and controllably moving the arc produced in the small gap between the two pipes in the thickness direction of the end edges of the two pipes. Therefore, both the prior art (1) and the prior art (2) require a complicated welding apparatus, and when two pipes are to be welded, it is not easy to set another magnetizing coil or an electrically conductive cylinder in the two pipes. Particularly when welding a new pipe to an already laid pipe in a laying site of pipes, it is difficult to install an electrically conductive cylinder, as in the above-mentioned prior art (2), connected to another power source in the two pipes concentrically with the two pipes at a position near the small gap between the end edges of the two pipes, to form another electric circuit.

Under such circumstances, there is a strong demand for an improved method which allows, when welding two objects of welding placed in butt formation with a small gap between the end edges thereof by a magnetically driven arc, uniform heating of the end edges of the two objects of welding in the welding line direction and in the thickness direction thereof to a welding temperature, by moving the arc produced in the small gap between the two objects of welding along the welding line formed between the two objects of welding, and, at the same time, by continuously moving the arc in the thickness direction of the end edges of the two objects of welding, thus which gives a high-quality weld, but such a method is not as yet proposed.

SUMMARY OF THE INVENTION

An object of the present invention is therefore to provide a method which allows, when welding two objects of welding placed in butt formation with a small gap between the end edges thereof by a magnetically driven arc, uniform heating of the end edges of the two objects of welding in the welding line direction and in the thickness direction thereof to a welding temperature, by moving the arc produced in the small gap between the two objects of welding along the welding line formed between the two objects of welding, and, at the same time, by continuously moving the arc in the thickness direction of the end edges of the two objects of welding, thus which gives a high-quality weld.

In accordance with one of the features of the present invention, there is provided a method for welding by a magnetically driven arc, which comprises the steps of:

placing two objects of welding in butt formation with a small gap between the end edges thereof, said small gap forming a welding line between said two objects of welding; connecting said two objects of welding to a welding power source by a cable to form an electric circuit comprising said welding power source, said cable and said two objects of welding; flowing a welding current through said electric circuit to produce an arc in said small gap between said two objects of welding; providing a magnetizing coil in parallel with said welding line between said two objects of welding, near said end edges of each of said two objects of welding, said magnetizing coils producing a magnetic flux in said small gap in the thickness direction of said two objects of welding; moving said arc along said welding line under the effect of the electromagnetic force in the direction of said welding line produced by said magnetic flux and said welding current flowing through said arc; heating said end edges of said two objects of welding to a welding temperature with the heat of said arc along said welding line; and pushing said heated end edges of said two objects of welding against each other to weld together said two objects of welding along said welding line;

characterized by:

dividing said electric circuit for producing said arc in said small gap between said two objects of welding into a first electric circuit and a second electric circuit, said first electric circuit comprising said two objects of welding and a cable arranged on the surface side of said two objects of welding, said second electric circuit comprising said two objects of welding and another cable arranged on the back side of said two objects of welding, and said first electric circuit and said second electric circuit being parallelly connected to said welding power source so that the direction of magnetic flux interlinking with a first region surrounded by said first electric circuit and the direction of magnetic flux interlinking with a second region surrounded by said second electric circuit are opposite to each other;

changing the amount of said welding current flowing through said first electric circuit to control the strength of a first electromagnetic force in the thickness direction of said two objects of welding produced by said welding current flowing through said first electric circuit and the magnetic flux interlinking with the first region surrounded by said first electric circuit; and simultaneously changing the amount of said welding current flowing through said second electric circuit to control the strength of a second electromagnetic force, having a direction opposite to the direction of said first electromagnetic force, in the thickness direction of said two objects of welding produced by said welding current flowing through said second electric circuit and the magnetic flux interlinking with the second region surrounded by said second electric circuit;

thereby continuously and controllably moving said arc produced in said small gap between said two objects of welding in the thickness direction of said end edges of said two objects of welding by the difference in strength between the first and second electromagnetic forces, so that said end edges of said two objects of welding are uniformly heated to a welding temperature in said thickness direction with the heat of said arc.

DETAILED DESCRIPTION OF PREFERRED EMBODIMENTS

From the above-mentioned point of view, we carried out extensive studies to develop a method which allows, when welding two objects of welding placed in butt formation with a small gap between the end edges thereof by a magnetically driven arc, uniform heating of the end edges of the two objects of welding in the welding line direction and in the thickness direction thereof to a welding temperature, by moving the arc produced in the small gap between the two objects of welding along the welding line formed between the two objects of welding, and, at the same time, by continuously moving the arc in the thickness direction of the end edges of the two objects of welding, thus gives a high-quality weld.

Figure 1:
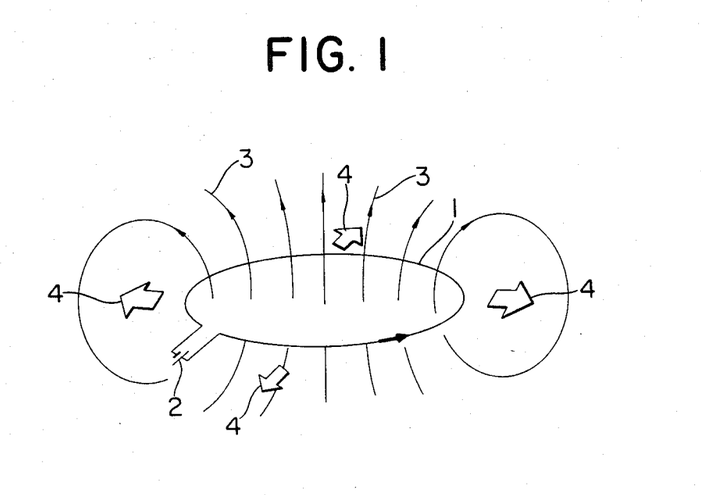
FIG. 1 is a descriptive drawing illustrating the principle of generation of electromagnetic force around the electric circuit.

We noted that the position of an arc produced in a small gap between two objects of welding in the thickness direction of the end edges of the two objects of welding is dependent on the electric circuit through which a welding current for producing a welding arc flows. More particularly, when flowing electric current through an electric circuit comprising an annular cable 1 and a power source 2 as shown by the arrow in FIG. 1, a magnetic flux 3 interlinking with the region surrounded by the annular cable 1 is produced. As a result, electromagnetic force 4 is produced in the direction expanding the annular cable 1 to outside in accordance with Fleming's left-hand rule under the effect of the electric current flowing through the annular cable 1 and the magnetic flux 3.

Figure 2:
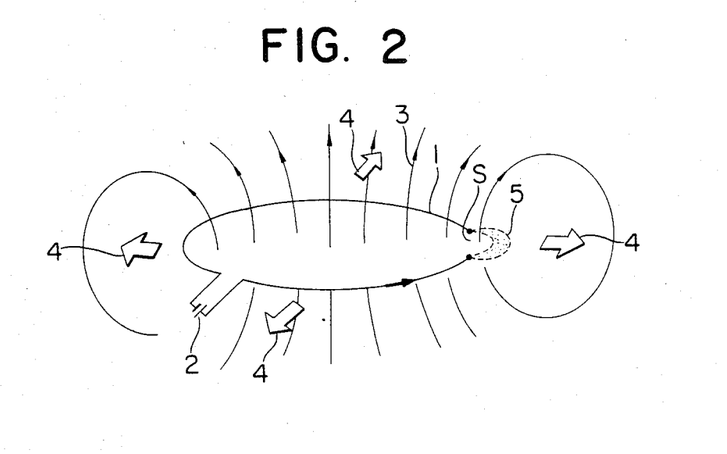
FIG. 2 is a descriptive drawing illustrating the principle of deflection of arc an under the effect of electromagnetic force produced around the electric circuit.

Then, when providing a small gap S in the middle of the annular cable 1 and producing an arc 5 in the small gap S, the arc 5 deflects toward the outside of the small gap S under the effect of the above-mentioned electromagnetic force 4. This effect of electromagnetic force 4 acting on the arc 5 is so large that, if the electromagnetic force is strong over a certain limit, the arc 5 excessively deflects to outside to disappear.

Figure 3:
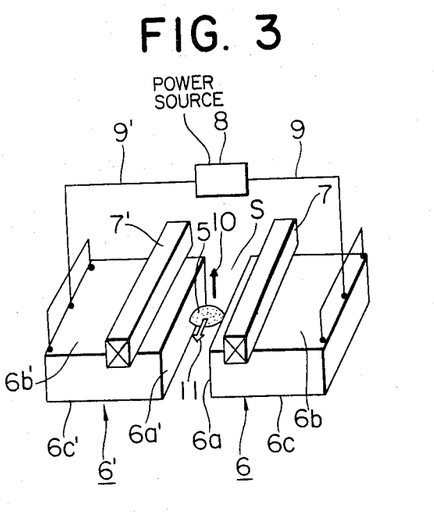
FIG. 3 is a schematic descriptive drawing illustrating a conventional method for welding two metal plates by a magnetically driven arc, in which an electric circuit is arranged on the surface side of the two plates.
Figure 4:
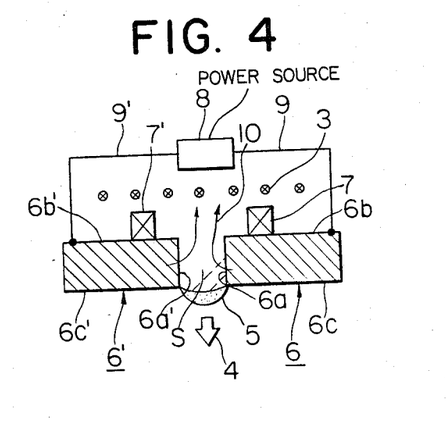
FIG. 4 is a schematic descriptive drawing illustrating the deflection of arc an in the case where two plates are welded together by the conventional method as shown in FIG. 3.

We investigated the state of the arc in the case of welding two metal plates by a magnetically driven arc, on the basis of the above-mentioned relationship between electromagnetic force and arc. In FIGS. 3 and 4, 6 is a first metal plate, 6' is a second metal plate. The first metal plate 6 and the second metal plate 6' are placed in butt formation with a small gap S between the respective end edges 6a and 6a', and the small gap S forms a welding line between the first metal plate 6 and the second metal plate 6'. The first metal plate 6 and the second metal plate 6' are connected to a welding power source 8 by cables 9 and 9' arranged on the side of the respective surfaces 6b and 6b' of the first metal plate 6 and the second metal plate 6'. The cables 9 and 9' are connected to the first metal plate 6 and the second metal plate 6' by a plurality of branch cables at a plurality of connecting points in a direction along the welding line so that welding current from the welding power source 8 uniformly flows through the first metal plate 6 and the second metal plate 6'. Thus, an electric circuit is formed, which comprises the welding power source 8, the first metal plate 6, the second metal plate 6', and the cables 9 and 9' arranged on the side of the respective sufaces 6b and 6b' of the first metal plate 6 and the second matel plate 6'. Flowing a welding current through this electric circuit produces an arc 5 in the small gap S between the end edge 6a of the first metal plate 6 and the end edge 6a' of the second metal plate 6'.

A first magnetizing coil 7 is provided on the surface 6b of the first metal plate 6 near the end edge 6a thereof in parallel with the welding line between the first metal plate 6 and the second metal plate 6'. A second magnetizing coil 7' is provided on the surface 6b' of the second metal plate 6' near the end edge 6a' thereof in parallel with the welding line mentioned above. The first magnetizing coil 7 and the second magnetizing coil 7' produce a magnetic flux 10 in the small gap S in the thickness direction of the first metal plate 6 and the second metal plate 6'. The electromagnetic field is designated by the symbols 3. As a result, the arc 5 moves along the welding line under the effect of an electromagnetic force 11 in the welding line direction produced by the magnetic flux 10 and the welding current flowing through the arc 5, and heats the end edge 6a of the first metal plate 6 and the end edge 6a' of the second metal plate 6' to a welding temperature along the welding line by the heat of the arc 5. Then, the first metal plate 6 and the second metal plate 6' are welded together along the welding line by pushing the respective end edges 6a and 6a' so heated of the first metal plate 6 and the second metal plate 6' against each other.

According to our studies, the arc 5 is in the following state when welding together the first metal plate 6 and the second metal plate 6' by the above-mentioned method:

(1) In a region shown by the dotted line in FIG. 4 surrounded by an electric circuit which comprises the first metal plate 6, the second metal plate 6' and the cables 9 and 9' arranged on the side of the respective surfaces 6b and 6b' of the first metal plate 6 and the second metal plate 6', a magnetic flux interlinking with said region is produced.

(2) The arc 5 moves in the small gap S in the thickness direction of the respective end edges 6a and 6a' of the first metal plate 6 and the second metal plate 6' toward the respective back surfaces 6c and 6c' thereof, under the effect of an electromagnetic force 4 in the thickness direction of the first metal plate 6 and the second metal plate 6', which is produced by the welding current flowing through said electric circuit and the magnetic flux interlinking with said region.

Figure 5:
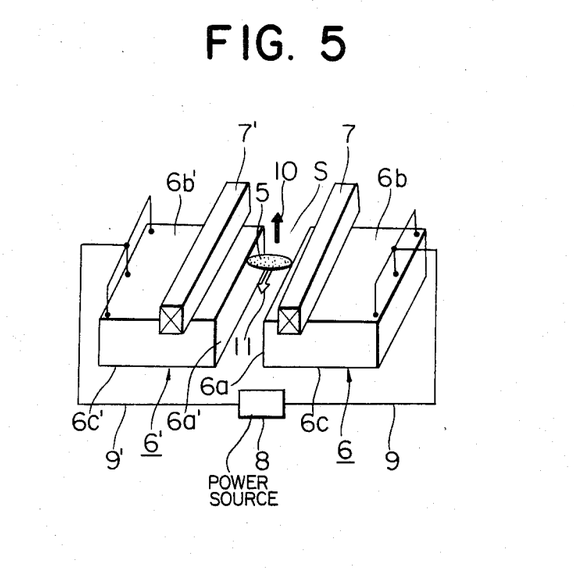
FIG. 5 is a schematic descriptive drawing illustrating an experimentation for welding two plates by a magnetically driven arc, in which an electric circuit is arranged on the back side of the two plates.
Figure 6:
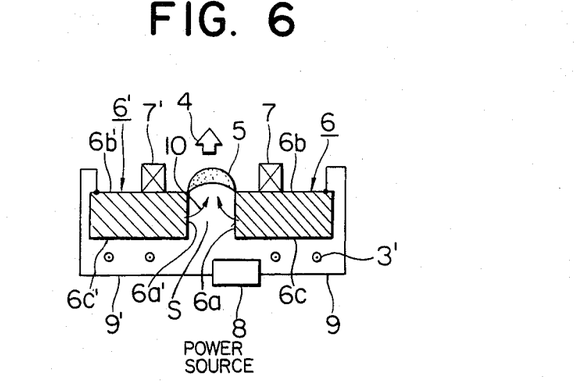
FIG. 6 is a schematic descriptive drawing illustrating the deflection of arc an in the case where two plates are welded together in the experimentation as shown in FIG. 5.

Then, we connected, as shown in FIGS. 5 and 6, the first metal plate 6 and the second metal plate 6' to the welding power source 8 by the cables 9 and 9' arranged on the side of the respective back surfaces 6c and 6c' of the first metal plate 6 and the second metal plate 6', and investigated the state of the arc 5 when welding the first metal plate 6 and the second metal plate 6' by the above-mentioned method. According to the result of this investigation, the arc 5 is in the following state:

(1) In a region shown by the dotted line in FIG. 6 surrounded by the electric circuit which comprises the first metal plate 6, the second metal plate 6' and the cables 9 and 9' arranged on the side of the respective back surfaces 6c and 6c' of the first metal plate 6 and the second metal plate 6', a magnetic flux interlinking with said region is produced.

(2) The arc 5 moves in the small gap S in the thickness direction of the respective end edges 6a and 6a' of the first metal plate 6 and the second metal plate 6' toward the respective surfaces 6b and 6b' thereof, under the effect of an electromagnetic force 4 in the thickness direction of the first metal plate 6 and the second metal plate 6', which is produced by the welding current flowing through said electric circuit and the magnetic flux 3 interlinking with said region.

Figure 7:
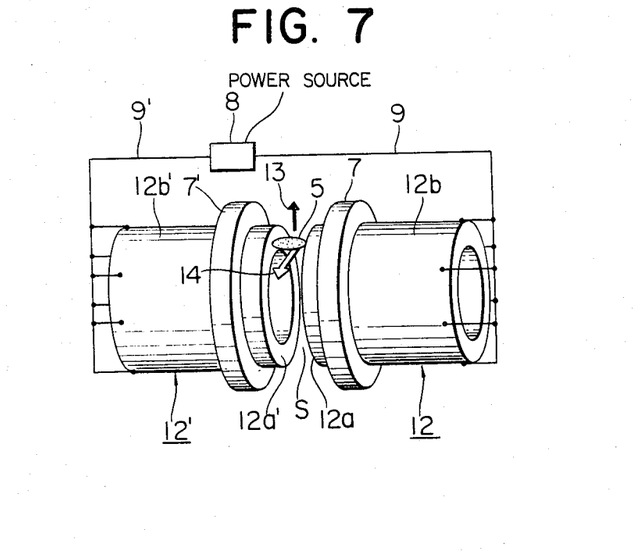
FIG. 7 is a schematic descriptive drawing illustrating another conventional method for welding two metal pipes by a magnetically driven arc, in which an electric circuit is arranged on the surface side of the two metal pipes.
Figure 8:
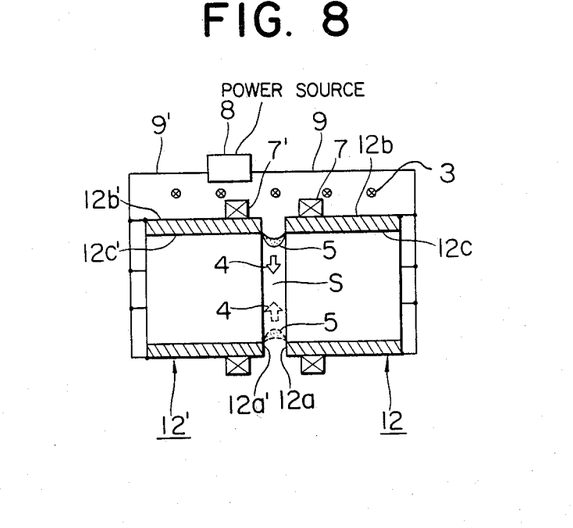
FIG. 8 is a schematic descriptive drawing illustrating the deflection of arc an in the case where two metal pipes are welded together by the conventional method as shown in FIG. 7.

In addition, we investigated the state of the arc in the case of welding two metal pipes by a magnetically driven arc. In FIGS. 7 and 8, 12 is a first metal pipe, 12' is a second metal pipe. The first metal pipe 12 and the second metal pipe 12' are placed in butt formation with a small gap S between the respective end edges 12a and 12a', and the small gap S forms an annular welding line between the first metal pipe 12 and the second metal pipe 12'. The first metal pipe 12 and the second metal pipe 12' are connected to a welding power source 8 by cables 9 and 9' arranged on the side of the respective surfaces 12b and 12b' of the first metal pipe 12 and the second metal pipe 12'. The cables 9 and 9' are connected to the first metal pipe 12 and the second metal pipe 12' by a plurality of branch cables at a plurality of connecting points in a direction along the welding line so that welding current from the welding power source 8 uniformly flows through the first metal pipe 12 and the second metal pipe 12'. Thus, the electric circuit is formed, which comprises the welding power source 8, the first metal pipe 12, the second metal pipe 12' and the cables 9 and 9' arranged on the side of the respective surfaces 12b and 12b' of the first metal pipe 12 and the second metal pipe 12'. Flowing a welding current through this electric circuit produces an arc 5 in the small gap S between the end edge 12a of the first metal pipe 12 and the end edge 12a' of the second metal pipe 12'.

A first annular magnetizing coil 7 is provided on the surface 12b of the first metal pipe 12 near the end edge 12a thereof in parallel with the annular welding line between the first metal pipe 12 and the second metal pipe 12'. A second annular magnetizing coil 7' is provided on the surface 12b' of the second metal pipe 12' near the end edge 12a' thereof in parallel with the annular welding line mentioned above. The first magnetizing coil 7 and the second magnetizing coil 7' produce a magnetic flux 13 in the small gap S in the thickness direction of the first metal pipe 12 and the second metal pipe 12'. As a result, the arc 5 rotates along the annular welding line under the effect of an electromagnetic force 14 in the annular welding line direction produced by the magnetic flux 13 and the welding current flowing through the arc 5, and heats the end edge 12a of the first metal pipe 12 and the end edge 12a' of the second metal pipe 12' to a welding temperature along the annular welding line by the heat of the arc 5. Then, the first metal pipe 12 and the second metal pipe 12' are welded together along the annular welding line by pushing the respective end edges 12a and 12a' so heated of the first metal pipe 12 and the second metal pipe 12' against each other.

According to our studies, the arc 5 is in the following state when welding together the first metal pipe 12 and the second metal pipe 12' by the above-mentioned method:

(1) In the region shown by the dotted line in FIG. 8 surrounded by the electric circuit which comprises the first metal pipe 12, the second metal pipe 12' and the cables 9 and 9' arranged on the side of the respective surfaces 12b and 12b' of the first metal pipe 12 and the second metal pipe 12', a magnetic flux interlinking with this region is produced.

(2) The arc 5 moves in the small gap S in the thickness direction of the respective end edges 12a and 12a' of the first metal pipe 12 and the second metal pipe 12' toward the respective back surfaces 12c and 12c' thereof, under the effect of the electromagnetic force 4 in the thickness direction of the first metal pipe 12 and the second metal pipe 12', which is produced by the welding current flowing through said electric circuit and the magnetic flux interlinking with said region.

The cause of the conventional problem in which, when welding two metal pipes by a magnetically driven arc, the arc rotates mainly on the back surface side of the metal pipes and excessively deflects on the back surface side of the metal pipes to disappear, may be clarified with reference to the above-mentioned phenomenon.

Figure 9:
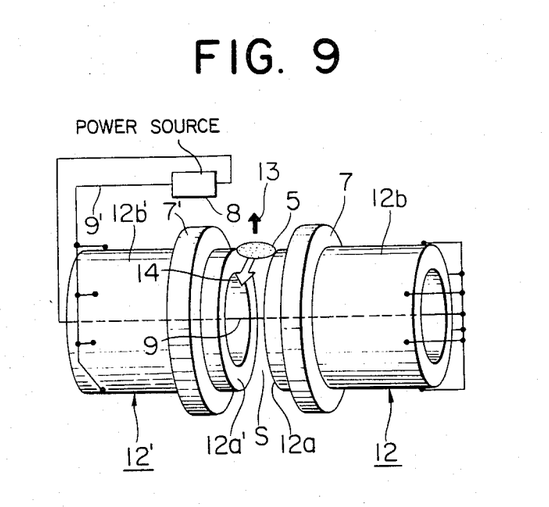
FIG. 9 is a schematic descriptive drawing illustrating another experimentation for welding two metal pipes by a magnetically driven arc, in which an electric circuit is arranged on the back side of the two metal pipes.
Figure 10:
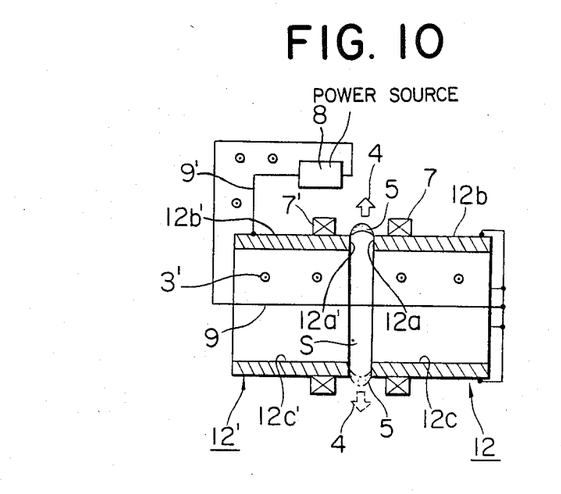
FIG. 10 is a schematic descriptive drawing illustrating the deflection of arc an in the case where two metal pipes are welded together in the experimentation as shown in FIG. 9.

Then, we connected, as shown in FIGS. 9 and 10, the first metal pipe 12 and the second metal pipe 12' to the welding power source 8 by the cable 9 arranged on the side of the respective back surfaces 12c and 12c' of the first metal pipe 12 and the second metal pipe 12' and the cable 9' arranged on the side of the surface 12b' of the second metal pipe 12, and investigated the state of the arc when welding the first metal pipe 12 and the second metal pipe 12' by the above-mentioned method. As a result, the arc 5 was found to be in the following state:

(1) In a region shown by the dotted line in FIG. 10 surrounded by the electric circuit which comprises the first metal pipe 12, the second metal pipe 12', the cable 9 arranged on the side of the respective back surfaces 12c and 12c' of the first metal pipe 12 and the second metal pipe 12', and the cable 9' arranged on the side of the surface 12b' of the second metal pipe 12', a magnetic flux interlinking with said region is produced.

(2) The arc 5 moves in the small gap S in the thickness direction of the respective end edges 12a and 12a' of the first metal pipe 12 and the second metal pipe 12' toward the respective surfaces 12b and 12b' thereof, under the effect of an electromagnetic force 4 in the thickness direction of the first metal pipe 12 and the second metal pipe 12', which is produced by the welding current flowing through said electric circuit and the magnetic flux interlinking with said region.

We thus obtained from our studies as mentioned above the finding that the arc produced in the small gap between two objects of welding moves in the thickness direction of the end edges of the two objects of welding under the effect of the electromagnetic force in the thickness direction of the two objects of welding produced by the welding current, which produces the arc, flowing through the electric circuit and the magnetic flux interlinking with the region surrounded by said electric circuit, and that the moving direction of the arc 5 depends upon whether the cable forming the above-mentioned electric circuit is arranged on the surface side or on the back side of the two objects of welding.

The present invention was made on the basis of the above-mentioned finding, and the method of the present invention for welding by a magnetically driven arc comprises the steps of:

placing two objects of welding in butt formation with a small gap between the end edges thereof, said small gap forming a welding line between said two objects of welding; connecting said two objects of welding to a welding power source by a cable to form an electric circuit comprising said welding power source, said cable and said two objects of welding; flowing a welding current through said electric circuit to produce an arc in said small gap between said two objects of welding; providing a magnetizing coil in parallel with said welding line between said two objects of welding, near said end edge of each of said two objects of welding, said magnetizing coils producing a magnetic flux in said small gap in the thickness direction of said two objects of welding; moving said arc along said welding line under the effect of the electromagnetic force in the direction of said welding line produced by said magnetic flux and said welding current flowing through said arc; heating said end edges of said two objects of welding to a welding temperature with the heat of said arc along said welding line; and pushing said heated end edges of said two objects of welding against each other to weld together said two objects of welding along said welding line;

characterized by:

dividing said electric circuit for, producing said arc in said small gap between said two objects of welding into a first electric circuit and a second electric circuit, said first electric circuit comprising said two objects of welding and a cable arranged on the surface side of said two objects of welding, said second electric circuit comprising said two objects of welding and another cable arranged on the back side of said two objects of welding, and said first electric circuit and said second electric circuit being parallelly connected to said welding power source so that the direction of magnetic flux interlinking with a first region surrounded by said first electric circuit and the direction of magnetic flux interlinking with a second region surrounded by said second electric circuit are opposite to each other;

changing the amount of said welding current flowing through said first electric circuit to control the strength of a first electromagnetic force in the thickness direction of said two objects of welding produced by said welding current flowing through said first electric circuit and the magnetic flux interlinking with the first region surrounded by said first electric circuit; and simultaneously changing the amount of said welding current flowing through said second electric circuit to strength of a second control the electromagnetic force, having a direction opposite to the direction of said first electromagnetic force, in the thickness direction of said two objects of welding produced by said welding current flowing through said second electric circuit and the magnetic flux interlinking with the second region surrounded by said second electric circuit;

thereby continuously and controllably moving said arc produced in said small gap between said two objects of welding in the thickness direction of said end edges of said two objects of welding by the difference in strength between the first and second electromagnetic forces, so that said end edges of said two objects of welding are uniformly heated to a welding temperature in said thickness direction with the heat of said arc.

Now, the method of the present invention for welding by a magnetically driven arc is described below with reference to the drawings.

Figure 11:
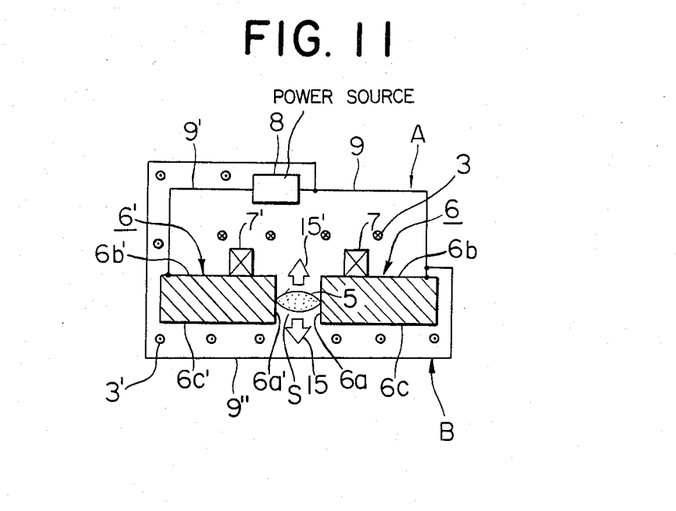
FIG. 11 is a schematic descriptive drawing illustrating an embodiment of the method of the present invention for welding two plates by a magnetically driven arc.

FIG. 11 is a schematic descriptive drawing illustrating an embodiment of the method of the present invention for welding two metal plates by a magnetically driven arc. A first metal plate 6 and a second metal plate 6' are placed in butt formation with a small gap S between the respective end edges 6a and 6a' thereof, and the small gap S forms a welding line between the first metal plate 6 and the second metal plate 6'. The electric circuit for producing an arc 5 in the small gap 5 between the first metal plate 6 and the second metal plate 6' comprises a first electric circuit A and a second electric circuit B. The first electric circuit A comprises the first metal plate 6, the second metal plate 6', and cables 9 and 9' arranged on the side of the respective surfaces 6b and 6b' of the first metal plate 6 and the second metal plate 6'. The second electric circuit B comprises the first metal plate 6, the second metal plate 6', a cable 9" arranged on the side of the respective back surfaces 6c and 6c' of the first metal plate 6 and the second metal plate 6', and the cable 9' in common to the first electric circuit A. The first electric circuit A and the second electric circuit B are parallelly connected to a welding power source 8. The cables 9 and 9' are connected to the first metal plate 6 and the second metal plate 6' by a plurality of branch cables not shown at a plurality of connecting points in a direction along the welding line so that the welding current from the welding power source 8 uniformly flows through the first metal plate 6 and the second metal plate 6'. Flowing the welding current through the first electric circuit A and the second electric circuit B mentioned above produces an arc 5 in the small gap S between the first metal plate 6 and the second metal plate 6'.

A first magnetizing coil 7 is provided on the surface 6b of the first metal plate 6 near the end edge 6a thereof in parallel with the welding line between the first metal plate 6 and the second metal plate 6'. A second magnetizing coil 7 is provided on the surface 6b' of the second metal plate 6' near the end edge 6a' thereof in parallel with the welding line. The first magnetizing coil 7 and the second magnetizing coil 7' produce a magnetic flux in the samll gap S in the thickness direction of the first metal plate 6 and the second metal plate 6'. As a result, the arc 5 moves along the welding line under the effect of electromagentic force in the direction of the welding line produced by said magnetic flux and the welding current flowing through the arc 5.

In a first region surrounded by the first electric circuit A, a magnetic flux interlinking with the first region is produced, and also in a second region surrounded by the second electric circuit B, another magnetic flux interlinking with the second region is produced. The arc 5 moves in the small gap S in the thickness direction of the respective end edges 6a and 6a' of the first metal plate 6 and the second metal plate 6' toward the respective back surfaces 6c and 6c' thereof, under the effect of a first electromagnetic force 15 in the thickness direction of the first metal plate 6 and the second metal plate 6', which is produced by the welding current flowing through the first electric circuit A and the magentic flux interlinking with the first region. On the other hand, the arc 5 moves in the small gap S in the thickness direction of the respective end edges 6a and 6a' of the first metal plate 6 and the second metal plate 6' toward the respective surfaces 6b and 6b' thereof, under the effect of a second electromagnetic force 15', in the direction opposite to that of the first electromagnetic force 15, which is produced by the welding current flowing through the second electric circuit B and the magnetic flux interlinking with the second region. Therefore, the arc 5 continuously and controllably moves in the thickness direction of the respective end edges 6a and 6a' of the first metal plate 6 and the second metal plate 6', by controlling the first electromagnetic force 15 through change of the amount of welding current flowing through the first electric circuit A, and by simultaneously controlling the second electromagnetic force 15' through change of the amount of welding current flowing through the second electric circuit B. As a result, the end edge 6a of the first metal plate 6 and the end edge 6a' of the second metal plate 6' are uniformly heated to a welding temperature by the heat of the arc 5 continuously moving in the welding line direction and in the thickness direction of the first metal plate 6 and the second metal plate 6'.

Figure 12:
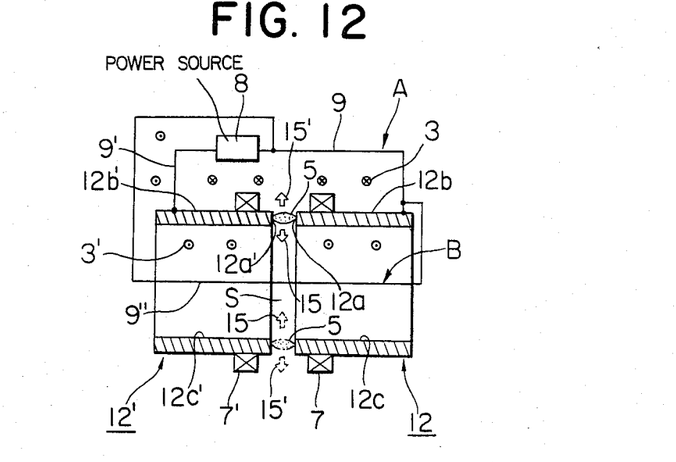
FIG. 12 is a schematic descriptive drawing illustrating another embodiment of the method of the present invention for welding two metal pipes by a magnetically driven arc.

FIG. 12 is a schematic description drawing illustrating another embodiment of the method of the present invention for welding two metal pipes by a magnetically driven arc. A first metal pipe 12 and a second metal pipe 12' are placed in butt formation with a small gap S between the respective end edges 12a and 12a' thereof, and the small gap S forms an annular welding line between the first metal pipe 12 and the second metal pipe 12'. The electric circuit for producing an arc 5 in the small gap S between the first metal pipe 12 and the second metal pipe 12' comprises a first electric circuit A and a second electric circuit B. The first electric circuit A comprises the first metal pipe 12, the second metal pipe 12', and cables 9 and 9' arranged on the side of the respective surfaces 12b and 12b' of the first metal pipe 12 and the second metal pipe 12'. The second electric circuit B comprises the first metal pipe 12, the second metal pipe 12', a cable 9" arranged on the side of the respective back surfaces 12c and 12c' of the first metal pipe 12 and the second metal pipe 12', and the cable 9' in common to the first electric circuit A. The first electric circuit A and the second electric circuit B are parallelly connected to a welding power source 8. The cables 9 and 9' are connected to the first metal pipe 12 and the second metal pipe 12' by a plurality of branch cables not shown at a plurality of connecting points in a direction along the annular welding line so that the welding current from the welding power source 8 uniformly flows through the first metal pipe 12 and the second metal pipe 12'. Flowing the welding current through the first electric circuit A and the second electric circuit B mentioned above produces an arc 5 in the small gap S between the first metal pipe 12 and the second metal pipe 12'.

A first magnetizing coil 7 is provided on the surface 12b of the first metal pipe 12 near the end edge 12a thereof in parallel with the annular welding line between the first metal pipe 12 and the second metal pipe 12'. A second magnetizing coil 7' is provided on the surface 12b' of the second metal pipe 12' near the end edge 12a' thereof in parallel with the annular welding line. The first magnetizing coil 7 and the second magnetizing coil 7' produce a magnetic flux in the small gap S in the thickness direction of the first metal pipe 12 and the second metal pipe 12'. As a result, the arc 5 rotates along the annular welding line under the effect of electromagnetic force in the direction of the annular welding line produced by said magnetic flux and the welding current flowing through the arc 5.

In a first region surrounded by the first electric circuit A, a magnetic flux interlinking with the first region is produced, and also in a second region surrounded by the second electric circuit B, another magnetic flux interlinking with the second region is produced. The arc 5 moves in the small gap S in the thickness direction of the respective end edges 12a and 12a' of the first metal pipe 12 and the second metal pipe 12' torward the respective back surfaces 12c and 12c' thereof, under the effect of a first electromagnetic force 15 in the thickness direction of the first metal pipe 12 and the second metal pipe 12', which is produced by the welding current flowing through the first electric circuit A and the magnetic flux interlinking with the first region. On the other hand, the arc 5 moves in the small gap S in the thickness direction of the respective end edges 12a and 12a' of the first metal pipe 12 and the second metal pipe 12' toward the respective surfaces 12b and 12b' thereof, under the effect of a second electromagnetic force 15', in the direction opposite to that of the first electromagnetic force 15, which is produced by the welding current flowing through the second electric circuit B and the magnetic flux interlinking with the second region. Therefore, the arc 5 continuously and controllably moves in the thickness direction of the respective end edges 12a and 12a' of the first metal pipe 12 and the second metal pipe 12', by controlling the first electromagnetic force 15 through change of the amount of welding current flowing through the first electric circuit A, and by simultaneously controlling the second electromagnetic force 15' through change of the amount of the welding current flowing through the second electric circuit B. As a result, the end edge 12a of the first metal pipe 12 and the end edge 12a' of the second metal pipe 12' are uniformly heated to a welding temperature by the heat of the arc 5 continuously moving in the annular welding line direction and in the thickness direction of the first metal pipe 12 and the second metal pipe 12'.

Figure 13:
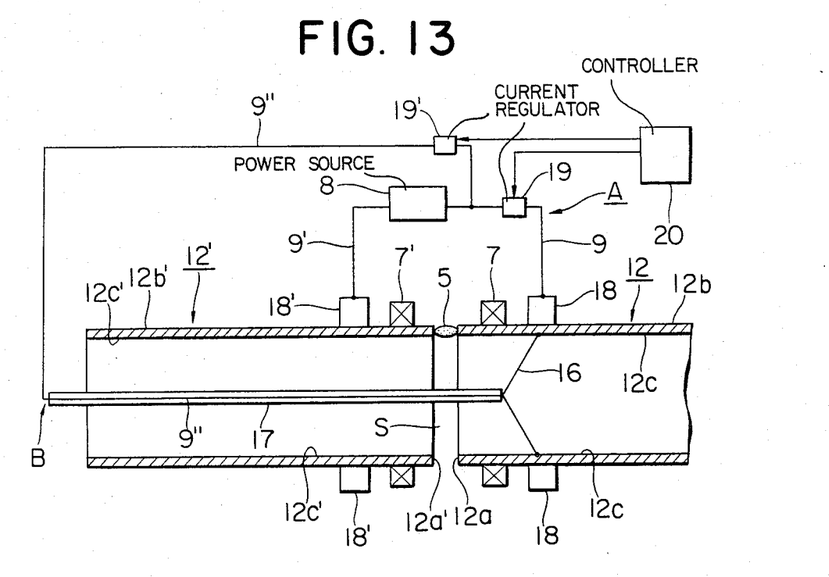
FIG. 13 is a schematic descriptive drawing illustrating an embodiment of the method for changing the amount of welding current flowing through the electric circuit, in carrying out the method of the present invention for welding two metal pipes by a magnetically driven arc.

FIG. 13 is a schematic descriptive drawing illustrating an embodiment of the method for changing the amount of welding current flowing through the electric circuit, in carrying out the method of the present invention for welding two metal pipes by a magnetically driven arc. In FIG. 13, 12 is a first metal pipe already laid, and 12' is a second metal pipe to be welded to the first metal pipe 12. A power supplier 16 is first fitted to the back surface 12c of the first metal pipe 12. An end of a cable 9" isolated by an isolation pipe 17 is connected through the interior of the second metal pipe 12' to the power supplier 16. The outer peripheries of the first metal pipe 12 and the second metal pipe 12' are respectively clamped by conductive clamping mechanisms 18 and 18'. The second metal pipe 12' is placed in butt formation against the first metal pipe 12 with a small gap S between the end edge 12a' of the second metal pipe 12' and the end edge 12a of the first metal pipe 12. The small gap S forms an annular welding line between the first metal pipe 12 and the second metal pipe 12'.

The electric circuit for producing an arc 5 in the small gap S between the first metal pipe 12 and the second metal pipe 12' comprises a first electric circuit A and a second electric circuit B. The first electric circuit A comprises the first metal pipe 12, the second metal pipe 12', a cable 9 arranged on the surface side 12b of the first metal pipe 12, which connects the clamping mechanism 18 fitted to the first metal pipe 12 with a welding power source 8, and a cable 9' arranged on the surface side 12b' of the second metal pipe 12' which connects the clamping mechanism 18' fitted to the second metal pipe 12' with the welding power source 8. The second electric circuit B comprises the first metal pipe 12, the second metal pipe 12', the cable 9" arranged on the respective back surface sides 12c and 12c' of the first metal pipe 12 and the second metal pipe 12', and the cable 9' in common to the first electric circuit A. The first electric circuit A and the second electric circuit B are parallelly connected to the welding power source 8.

In FIG. 13, 19 is a first welding current regulator provided in the middle of the cable 9 of the first electric circuit A for regulating the amount of welding current flowing through the first electric circuit A, 19' is a second welding current regulator provided in the middle of the cable 9" of the second electric circuit B for regulating the amount of welding current flowing through the second electric circuit B, 20 is a controller for providing control signals to the first welding current regulator 19 and the second welding current regulator 19', 7 is a first magnetizing coil provided on the surface 12b of the first metal pipe 12 near the end edge 12a thereof in parallel with the annular welding line, and 7' is a second magnetizing coil provided on the surface 12b' of the second metal pipe 12' near the end edge 12b' thereof in parallel with an annular welding line. The first magnetizing coil 7 and the second magnetizing coil 7' produce a magnetic flux in the small gap S in the thickness direction of the first metal pipe 12 and the second metal pipe 12'.

An arc 5 produced between the first metal pipe 12 and the second metal pipe 12' by flowing a welding current through the first electric circuit A and the second electric circuit B rotates along the annular welding line under the effect of electromagnetic force in the direction of the annular welding line, which is generated by the magnetic flux produced by the first and the second magnetizing coils 7 and 7', and the welding current flowing through the arc 5. The amount of welding current flowing through the first electric circuit A is increased and then decreased at prescribed time intervals by the first electric current regulator 19 which operates in accordance with the control signals from the controller 20, and the amount of welding current flowing through the second electric circuit B is simultaneously decreased and then increased by the second electric current regulator 19' which operates in accordance with the control signals from the controller 20, in inverse proportion to said increase and said decrease in the amount of welding current flowing through the first electric circuit A. As a result, the arc 5 rotating along the annular welding line continuously and controllably moves in the thickness direction of the respective end edges 12a and 12a' of the first metal pipe 12 and the second metal pipe 12'. Therefore, the end edge 12a of the first metal pipe 12 and the end edge 12a' of the second metal pipe 12' are uniformly heated to a welding temperature by the heat of the arc 5. Then, the second metal pipe 12' is welded to the first metal pipe 12 along the annular welding line by pushing the end edge 12a' of the second metal pipe 12' against the end edge 12a of the first metal pipe 12.

Figure 14:
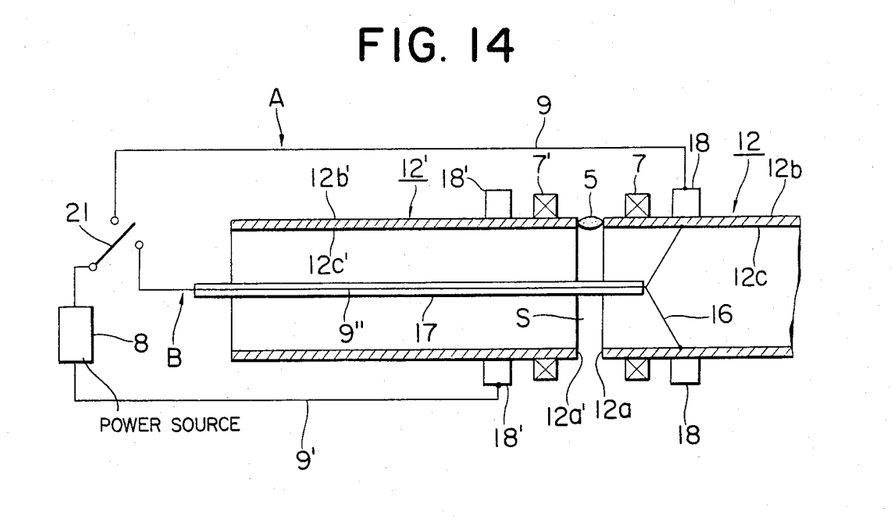
FIG. 14 is a schematic descriptive drawing illustrating another embodiment of the method for changing the amount of welding current flowing through the electric circuit, in carrying out the method of the present invention for welding two metal pipes by a magnetically driven arc.

FIG. 14 is a schematic descriptive drawing illustrating another embodiment of the method for changing the amount of welding current flowing through the electric circuit, in carrying out the method of the present invention for welding two metal pipes by a magnetically driven arc. This embodiment is different from that shown in FIG. 13 in that the welding current is alternately flowed through the first electric circuit A and the second electric circuit B at prescribed time intervals. More particularly, as shown in FIG. 14, the electric circuit for producing an arc 5 in a small gap S between a first metal pipe 12 and a second metal pipe 12' comprises a first electric circuit A and a second electric circuit B. The first electric circuit A comprises the first metal pipe 12, the second metal pipe 12', a cable 9 arranged on the respective surface sides 12b and 12b' of the first metal pipe 12 and the second metal pipe 12', which connects a clamping mechanism 18 fitted to the first metal pipe 12 with a welding power source 8, and a cable 9' arranged on the surface side 12b' of the second metal pipe 12', which connects a clamping mechanism 18' fitted to the second metal pipe 12' with the welding power source 8. The second electric circuit B comprises the first metal pipe 12, the second metal pipe 12', a cable 9" arranged on the respective back surface sides 12c and 12c' of the first metal pipe 12 and the second metal pipe 12', and the cable 9' in common to the first electric circuit A.

The cable 9 of the first electric circuit A and the cable 9" of the second electric circuit B are connected via a changeover switch 21 to the welding power source 8, and the cable 9' which is common to the first electric circuit A and the second electric circuit B is directly connected to the welding power source 8. Thus, the first electric circuit A and the second electric circuit B are parallelly connected to the welding power source 8.

When turning the changeover switch 21 on the side of the cable 9, welding current flows from the welding power source 8 through the first electric circuit A. As a result, the arc 5 moves in the small gap S in the thickness direction of the respective end edges 12a and 12a' of the first metal pipe 12 and the second metal pipe 12' toward the respective back surfaces 12c and 12c' thereof. On the other hand, when turning the changeover switch 21 on the side of the cable 9", welding current flows from the welding power source 8 thorugh the second electric circuit B. As a result, the arc 5 moves in the small gap S in the thickness direction of the respective end edges 12a and 12a' of the first metal pipe 12 and the second metal pipe 12' toward the respective surfaces 12b and 12b' thereof. Thus, the arc 5 continuously and controllably moves in the thickness direction of the respective end edges 12a and 12a' of the first metal pipe 12 and the second metal pipe 12' by alternately flowing the welding current through the first electric circuit A and then through the second electric circuit B at prescribed time intervals. Therefore, the end edge 12a of the first metal pipe 12 and the end edge 12a, of the second metal pipe 12' are uniformly heated to a welding temperature by the heat of the arc 5.

Figure 15:
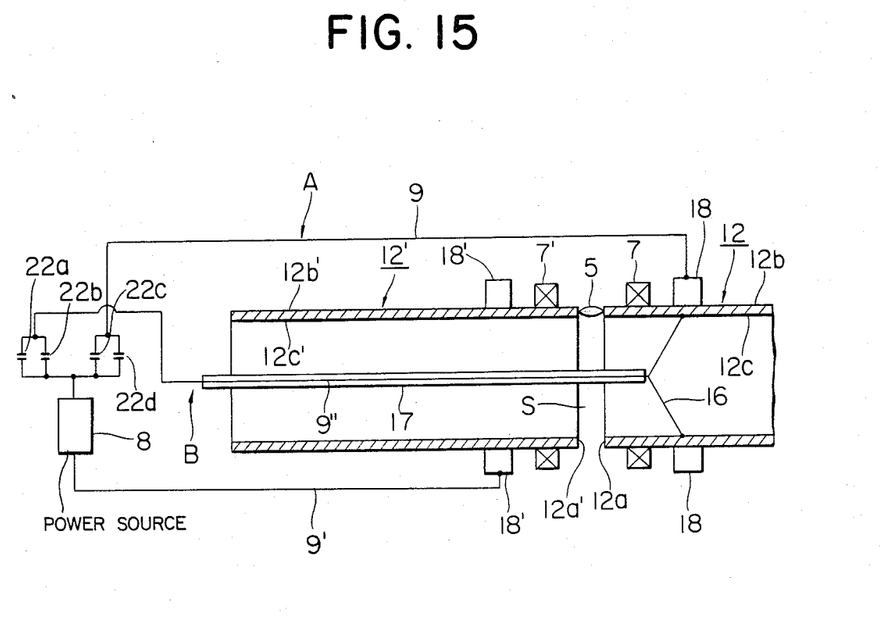
FIG. 15 is a schematic descriptive drawing illustrating still another embodiment of the method for changing the amount of welding current flowing through the electric circuit, in carrying out the method of the present invention for welding two metal pipes by a magnetically driven arc.

FIG. 15 is a schematic descriptive drawing illustrating still another embodiment of the method for changing the amount of welding current flowing through the electric circuit, in carrying out the method of the present invention for welding two metal pipes by a magnetically driven arc. In the embodiment, as in the embodiment shown in FIG. 14, the arc 5 is continuously moved in the thickness direction of the respective end edges 12a and 12a' of the first metal pipe 12 and the second metal pipe 12' by alternately flowing the welding current through the first electric circuit A and the second electric circuit B at prescribed time intervals.

In this embodiment, as shown in FIG. 15, the electric circuit for producing an arc 5 in a small gap S between a first metal pipe 12 and a second metal pipe 12' comprises a first electric circuit A and a second electric circuit B. The first electric circuit A comprises the first metal pipe 12, the second metal pipe 12', a cable 9 arranged on the respective surface sides 12b and 12b' of the first metal pipe 12 and the second metal pipe 12', which connects a clamping mechanism 18 fitted to the first metal pipe 12 with a welding power source 8, and a cable 9' arranged on the surface side 12b' of the second metal pipe 12', which connects a clamping mechanism 18' fitted to the second metal pipe 12' with the welding power source 8. The second electric circuit B comprises the first metal pipe 12, the second metal pipe 12', a cable 9" arranged on the respective back surface sides 12c and 12c' of the first metal pipe 12 and the second metal pipe 12', and the cable 9' in common to the first electric circuit A.

The cable 9 of the first electric circuit A is connected via parallelly arranged two switches 22c and 22d to the welding power source 8, and the cable 9" is connected via parallelly arranged switches 22a and 22b to the welding power source 8. All four switches 22a, 22b, 22c and 22d are parallelly connected to the welding power source 8. The cable 9' which is common to the first electric circuit A and the second electric circuit B is directly connected to the welding power source 8. Thus, the first electric circuit A and the second electric circuit B are parallelly connected to the welding power source 8.

Changeover of welding current by the four switches 22a, 22b, 22c and 22d is conducted as follows:

(1) The switches 22a and 22b are closed, and the switches 22c and 22d are opened. As a result, welding current flows only through the second electric circuit B, and the arc 5 moves toward the respective surfaces 12b and 12b' of the first metal pipe 12 and the second metal pipe 12'.

(2) The switches 22b and 22c are closed, and the switches 22d and 22a are opened. As a result, welding current flows both through the first electric circuit A and through the second electric circuit B.

(3) The switches 22c and 22d are closed, and the switches 22a and 22b are opened. As a result, welding current flows only through the first electric circuit A, and the arc 5 moves toward the respective back surfaces 12c and 12c' of the first metal pipe 12 and the second metal pipe 12'.

(4) The switches 22a and 22d are closed, and the switches 22b and 22c are opened. As a result, welding current flows both through the first electric circuit A and through the second electric circuit B.

The arc 5 continuously and controllably moves in the thickness direction of the respective end edges 12a and 12a' of the first metal pipe 12 and the second metal pipe 12' by sequentially and continuously carrying out the above-mentioned changeover of the switches 22a, 22b, 22c and 22d. Therefore, the end edge 12a of the first metal pipe 12 and the end edge 12a' of the second metal pipe 12' are uniformly heated by the heat of the arc 5 to a welding temperature. The arc 5 never disappears upon changeover of the switches 22a, 22b, 22c and 22d since welding current always flows through the first electric circuit A and/or through the second electric circuit B.

Now, the method of the present invention is described by means of an example.

EXAMPLE

Two steel pipes were welded together in accordance with the embodiment described above with reference to FIG. 15 under the following conditions:
(1) Dimensions of the object pipes of welding:
 Outside diameter: 216.3 mm
 Thickness: 7.8 mm
(2) Material of the object pipes of welding: carbon steel
(3) Gap between the object pipes of welding: 3.1 mm
(4) Welding current: 1,700A (direct current)
(5) Total magnetizing force of the two magnetizing coils: 20,000 AT
(6) Changeover cycle of the switches: 2.5 Hz
(7) Heating period: 20 seconds.

As a result of welding of the two steel pipes under the conditions as mentioned above, the respective end edges of the two steel pipes were uniformly heated to a welding temperature in the annular welding line direction and the thickness direction thereof, and thus, a high-quality weld was formed.

The above-mentioned Example covers the case where two metal pipes are welded together, but the same effect is available also in the case where two metal plates are welded together.

According to the method of the present invention for welding by a magnetically driven arc, as described above in detail, it is possible to form a high-quality weld between the two objects of welding which are placed in butt formation with a small gap between the end edges thereof, since the arc produced in said gap moves along the welding line formed between the two objects of welding, and at the same time, continuously and controllably moves in the thickness direction of the end edges of the two objects of welding, and hence the end edges of the two objects of welding are uniformly heated to a welding temperature in the welding line direction and the thickness direction, thus providing many industrially useful effects.

What is claimed is:
1. In a method for welding together two objects of welding by a magnetically driven arc, each object of welding having a first surface, a reverse surface, a thickness between said first and reverse surfaces, and an end edge comprising the steps of:
 placing two objects of welding in butt formation with a small gap between the end edges thereof, said small gap forming a welding line between said two objects of welding; connecting said two objects of welding to a welding power source by a cable to form an electric circuit comprising said welding power source, said cable and said two objects of welding; flowing a welding current through said electric circuit to produce an arc in said small gap between said two objects of welding; providing a magnetizing coil in parallel with said welding line between said two objects of welding, near said end edge of each of said two objects of welding, said magnetizing coils producing a magnetic flux in said small gap in the thickness direction of said two objects of welding; moving said arc along said welding line under the effect of an electromagnetic force in the direction of said welding line produced by said magnetic flux and said welding current flowing through said arc; heating said end edges of said two objects of welding to a welding tempera- ture with the heat of said arc along said welding line; and pushing said heated end edges of said two objects of welding against each other to weld together said two objects of welding along said welding line;

the improvement comprising:

dividing said electric circuit for producing said arc in said small gap between said two objects of welding into a first electric circuit and a second electric circuit, said first electric circuit comprising said two objects of welding and a cable arranged on the first surface side of said two objects of welding, said second electric circuit comprising said two objects of welding and another cable arranged on the reverse surface side of said two objects of welding, and said first electric circuit and said second electric circuit being connected in parallel to said welding power source so that the direction of magnetic flux interlinking with a first region surrounded by said first electric circuit and the direction of magnetic flux interlinking with a second region surrounded by said second electric circuit are opposite to each other;

changing the amount of said welding current flowing through said first electric circuit to control the strength of a first electromagnetic force in the thickness direction of said two objects of welding produced by said welding current flowing through said first electric circuit and said magnetic flux interlinking with said first region surrounded by said first electric circuit; and simultaneously changing the amount of said welding current flowing through said second electric circuit to control the strength of a second electromagnetic force, having a direction opposite to the direction of said first electromagnetic force, in the thickness direction of said two objects of welding produced by said welding current flowing through said second electric circuit and said magnetic flux interlinking with said second region surrounded by said second electric circuit;

thereby continuously and controllably moving said arc produced in said small gap between said two objects of welding in the thickness direction of said end edges of said two objects of welding by the difference in strength between said first electromagnetic force and said second electromagnetic force, so that said end edges of said two objects of welding are uniformly heated to a welding temperature in said thickness direction with the heat of said arc.

2. The method as claimed in claim 1, further comprising:

increasing and then decreasing the amount of said welding current flowing through said first electric circuit at prescribed time intervals, and simultaneously, decreasing and then increasing the amount of said welding current flowing through said second electric circuit in inverse proportion to said increase and said decrease in the amount of said welding current flowing through said first electric circuit, thereby controlling the strength of said first electromagnetic force in the thickness direction of said two objects of welding in said first electric circuit and the strength of said second electromagnetic force in said thickness direction in said second electric circuit.

3. The method as claimed in claim 1, further comprising:

flowing said welding current through said first electric circuit and said second electric alternately at prescribed time intervals, thereby controlling the strength of said first electromagnetic force in the thickness direction of said two objects of welding in said first electric circuit and the strength of said second electromagnetic force in said thickness direction in said second electric circuit.

4. The method as claimed in claim 1, wherein said two objects of welding are two metal plates.

5. The method as claimed in claim 1, wherein said two objects of welding are two metal pipes.

6. The method as claimed in claim 2, wherein said two objects of welding are two metal plates.

7. The method as claimed in claim 3, wherein said two objects of welding are two metal plates.

8. The method as claimed in claim 2, wherein said two objects of welding are two metal pipes.

9. The method as claimed in claim 3, wherein said two objects of welding are two metal pipes.

* * * * *

UNITED STATES PATENT AND TRADEMARK OFFICE
CERTIFICATE OF CORRECTION

PATENT NO. : 4,511,784
DATED : April 16, 1985
INVENTOR(S) : Hideaki MIYAMORI, et al It is certified that error appears in the above-identified patent and that said Letters Patent is hereby corrected as shown below:

In the Abstract, line 23, after "the end" change "edge" to --edges--;

Column 3, line 1, after "welding," delete "thus";

line 17, "welding, thus which" should read --welding, which--.

Column 4, line 24, after "deflection of" change "arc an" to

--an arc--;

line 31, after "deflection of" change "arc an" to

--an arc--;

line 39, after "deflection of" change "arc an" to

--an arc--;

UNITED STATES PATENT AND TRADEMARK OFFICE
CERTIFICATE OF CORRECTION

PATENT NO. : 4,511,784

DATED : April 16, 1985

INVENTOR(S) : Hideaki MIYAMORI, et al

It is certified that error appears in the above-identified patent and that said Letters Patent is hereby corrected as shown below:

Column 4, line 48, after "deflection of" change "arc an" to

--an arc--;

line 56, after "deflection of" change "arc an" to

--an arc--;

Column 7, line 16, change "flux 3" to --flux 3'--;

Column 9, line 54, change line to read --control the strength of a second electromagnetic force,--;

Column 18 (claim 3), line 26, after "second electric" insert

--circuit--.

Signed and Sealed this

Fifth Day of November 1985

[SEAL]

Attest:

DONALD J. QUIGG

Attesting Officer

Commissioner of Patents and Trademarks